(12) United States Patent
Atsumi

(10) Patent No.: US 8,488,268 B2
(45) Date of Patent: Jul. 16, 2013

(54) DISK DEVICE

(75) Inventor: Takenori Atsumi, Yamato (JP)

(73) Assignee: Hitachi, Ltd., Tokyo (JP)

( * ) Notice: Subject to any disclaimer, the term of this patent is extended or adjusted under 35 U.S.C. 154(b) by 577 days.

(21) Appl. No.: 12/740,242

(22) PCT Filed: Oct. 16, 2008

(86) PCT No.: PCT/JP2008/068754
§ 371 (c)(1),
(2), (4) Date: Aug. 23, 2010

(87) PCT Pub. No.: WO2009/057457
PCT Pub. Date: May 7, 2009

(65) Prior Publication Data
US 2010/0321819 A1    Dec. 23, 2010

(30) Foreign Application Priority Data

Oct. 30, 2007   (JP) ................................ 2007-281768

(51) Int. Cl.
*G11B 5/596*   (2006.01)
(52) U.S. Cl.
USPC .................................... 360/78.04; 360/77.02
(58) Field of Classification Search
None
See application file for complete search history.

(56) References Cited

U.S. PATENT DOCUMENTS

| | | | |
|---|---|---|---|
| 5,608,586 A | 3/1997 | Sri-Jayantha et al. | |
| 5,663,847 A * | 9/1997 | Abramovitch | 360/77.02 |
| 6,771,455 B1 * | 8/2004 | Yatsu | 360/77.06 |
| 7,054,094 B2 * | 5/2006 | Zhang et al. | 360/77.02 |
| 2001/0003497 A1 | 6/2001 | Takaishi | |
| 2001/0030828 A1 | 10/2001 | Takaishi | |
| 2002/0041472 A1 * | 4/2002 | Ding et al. | 360/290 |
| 2002/0126412 A1 | 9/2002 | Shibata | |
| 2004/0047066 A1 | 3/2004 | Shigematsu | |
| 2004/0228026 A1 | 11/2004 | Chang et al. | |
| 2007/0211371 A1 | 9/2007 | Atsumi et al. | |

FOREIGN PATENT DOCUMENTS

| | | |
|---|---|---|
| JP | 05-144047 | 6/1993 |
| JP | 05-217315 | 8/1993 |
| JP | 09-050303 | 2/1997 |
| JP | 2000-021104 | 1/2000 |
| JP | 2000-048499 | 2/2000 |
| JP | 2001-283543 | 10/2001 |
| JP | 2002-230928 | 8/2002 |
| JP | 2003-123415 | 4/2003 |
| JP | 2004-234712 | 8/2004 |
| JP | 2004-342298 | 12/2004 |
| JP | 2007-242148 | 9/2007 |

* cited by examiner

*Primary Examiner* — Andrew L Sniezek
(74) *Attorney, Agent, or Firm* — Antonelli, Terry, Stout & Kraus, LLP.

(57) ABSTRACT

In a positioning control system for a head of a magnetic disk device etc, a frequency of a disturbance oscillation having a specific oscillation component whose amplitude changes with a head position, is selected as a target frequency. Next, a resonance filter is so designed that it has a resonance characteristic at the target frequency and a variable gain device A having the gain changing with head position and a variable gain device B having inverse characteristics to the device A are connected to input and output terminals of the resonance filter, respectively. Input to the filter is made 0 during seek operation and an error signal is used as the input to the filter through the device A after the end of the seek operation. The variable gain devices A and B are controlled so that their product becomes 1.

12 Claims, 19 Drawing Sheets

DISK DEVICE

INCORPORATION BY REFERENCE

The present application claims priority from Japanese patent application JP 2007-2817458, filed on Oct. 30, 2007, the contents of which are hereby incorporated by reference into this application.

TECHNICAL FIELD

This invention relates to a disk device. More particularly, the invention relates to a disk device that makes it possible to conduct high speed positioning of a head of a magnetic disk device, an optical disk device, and so forth.

BACKGROUND ART

A magnetic head of a hard disk drive, a typical disk device as an external storage of a computer, follows a target track on a magnetic disk surface that is rotating and writes and reads data to and from the track. Therefore, the hard disk drive must have a control mechanism for correctly positioning the magnetic head onto the target track. The track width on the magnetic disk has become smaller in recent years to increase the storage capacity and improvement in positioning accuracy and positioning speed of the head has become more and more necessary.

A positioning control system of the magnetic head of a hard disk drive which is an example to which the present invention is directed, includes two kinds of controls, that is, seek control for moving the magnetic head to a target track and following control for allowing the magnetic head to accurately follow the same track.

Causes that deteriorate positioning accuracy of the head include disk oscillation resulting from fluid forces called "disk flutter", oscillation of a position signal that is in synchronism with the revolution of the disk and oscillation of a mechanical system (rotation-synchronous oscillation). These oscillations appear as specific frequencies such as a frequency that is integer multiples of the rotating frequency of the disk and a natural frequency of the mechanical system. To improve head positioning accuracy even when such oscillations exist, it is effective to design a positioning control system of the head by using a digital filter (resonance filter) having a resonance point at that frequency. To prevent the occurrence of transient response, such a resonance filter stops calculation during the seek operation of the head and starts the calculating operation after the head comes in the proximity of the target track. Therefore, the technology described above needs a long time for suppressing the disturbance after the head reaches the proximity of the target.

One of the prior art technologies for solving such a problem is the technology described in U.S. Pat. No. 5,608,586 (patent document 1). This prior art relates to the technology that allows a resonance filter to follow at a high speed an oscillation at a specific frequency without transient response, continues the calculation of the resonance filter during the seek operation by setting the input to the resonance filter to 0 and allows free oscillation of the resonance characteristics realized by the resonance filter.

DISCLOSURE OF THE INVENTION

The technology that sets the input to the resonance filter to 0 during the seek operation such as the technology described in the patent document 1 requires the condition that an internal variable of the resonance filter follows the oscillation characteristics before the seek operation. Therefore, this prior art technology is not free from the problem that when the oscillation characteristics at the object frequency have a difference in oscillation amplitude before and after the seek operation, positioning accuracy gets deteriorated. Particularly because the oscillation amplitude of the disk flutter and some of rotation-synchronous oscillations changes in accordance with the distance from the disk center, it is difficult to apply the means described in the patent document 1 to the positioning control system of the head.

In view of the problem described above, it is an object of the invention to provide a disk device that can allow a head position to quickly follow an oscillation at a specific frequency even when the oscillation amplitudes of specific frequency components before and after seeking of the head change in accordance with the distance from the disk center.

According to the invention, the object described above can be accomplished by a disk device including a control object constituted by an actuator, a head for executing a seek operation while being driven by the actuator and a circuit for taking out a head position signal from information read out by the head from an information recording medium and a control unit for generating an operation signal for the actuator so that an error signal as a difference between a target position of the head and a head position represented by the head position signal from the circuit becomes 0, wherein the control unit has a servo compensator for stabilizing transfer characteristics of the control object by using the error signal as an input, a variable gain device A the gain of which varies in accordance with the head position, a resonance filter using an output of the variable gain device A as its input and a variable gain device B using an output of the resonance filter as its input; the gain of the variable gain device A is an inverse number of the gain of the variable gain device B; an input signal to the variable gain device A is made 0 during the seek operation of the head and is the error signal near the end of the seek operation; and a signal as the sum of the output signal of the variable gain device B using the output signal of the resonance filter as its input signal and the output signal of the servo compensator is used as the input signal given to the actuator.

In the disk device described above, the gain of the variable gain device A which varies with the head position may be varied in accordance with a target head position during the seek operation. Alternatively, a resonance filter of variable gain constituted by a series circuit of the variable gain device A, the resonance filter 30 and the variable gain device B may be coupled in series with a servo compensator.

The invention can allow the head to correctly follow the recording track even when disturbance oscillation occurs.

Other objects, features and advantages of the invention will become more apparent from the following description of embodiments of the invention.

BEST MODE FOR CARRYING OUT THE INVENTION

Hereinafter, a disk device according to some embodiments of the invention will be explained in detail with reference to the drawings. Incidentally, although the embodiments of the invention will be explained about a hard disk drive as a magnetic disk device by way of example, the invention can be applied to disk devices of any types such as an optical disk as long as they are of the types that use a rotating disk as a recording medium.

FIG. 1 is a block diagram showing a basic construction of a hard disk drive according to a first embodiment of the invention. In the hard disk drive shown in FIG. 1, a magnetic disk 5 as a recording medium is fixed to a spindle motor 6 and is rotated at a predetermined number of revolutions. A pivot bearing 3 is arranged in parallel with the spindle motor shaft on a side direction of the magnetic disk 5 held by the spindle motor 6. A carriage 4 is fixed to the pivot bearing 3 in such a fashion as to be capable of swinging. A magnetic head 1 is fixed to an end of the carriage 4. To move (seek, follow) the magnetic head 1, a voice coil motor (VCM) 2 is arranged at the other end of the carriage 4 and generates power for moving the magnetic head 1. The carriage 4 and VCM 2 together constitute an actuator of the magnetic head 1.

The magnetic head 1 can know its own present position on the magnetic disk by detecting a position signal recorded in a servo sector 7 on the magnetic disk. The position signal detected by the magnetic head 1 is amplified by a head signal amplifier 8 and is demodulated by a servo signal demodulator 9. The servo signal 19 so demodulated becomes a position signal 20 through an A/D convertor 10 and is taken into MPU (Micro Processor Unit) 16 through a bus 13. The position signal 20 obtained in this way is processed by MPU 16 and a VCM control signal 21 hereinafter explained is generated.

MPU 16 is connected to ROM 15 and RAM 14 through the bus 13. ROM 15 stores various kinds of control programs executed by MPU 16 and parameters necessary for various kinds of controls. RAM 14 temporarily stores the data written into the magnetic disk 5 and the data read out from the magnetic disk 5. An interface controller 17 is connected to MPU 16 through the bus 13, receives a command from a host side controller 18 and generates read/write access request to MPU 16. When the command requiring data read/write is generated, MPU 16 executes a control program for head positioning that is recorded to ROM 15 and generates an optimum VCM control signal 21 in accordance with the distance to the target position from the position signal 20. The VCM control signal 21 thus generated is converted to a power amplifier control signal 22 through the D/A convertor 11, is converted to a current 23 through a power amplifier 12 and is applied to VCM 2. This VCM 2 generates driving force of the head actuator and positions the magnetic head 1 to the target position (recording track).

FIG. 2 is a block diagram showing a construction of a following control system realized by MPU 16. Next, the following control system will be explained with reference to FIG. 2. A numerical formula model of a control object 27 will be expressed hereby as P(z) for the ease of explanation. Here, the term "control object 27" represents a circuit portion ranging from the input 21 to the D/A convertor 11 to the output 20 of the A/D convertor 10 and a transfer function P(z) represents its input/output characteristics.

The following control system 28 mainly includes a servo compensator 29 (having a transfer function Cf(z)) for realizing desired control performance, a variable gain device A31 (having a variable gain KA) and a variable gain device B32 (having a variable gain KB) the gains of which vary in accordance with a head position, and a resonance filter 30 (having a transfer function Cr(z)) having a stable phase condition. The variable gain device A31 and the variable gain device B32 are connected to the input and output sides of the resonance filter 30, respectively, and the entire series circuit is connected in parallel with the servo compensator 29. Incidentally, the variable gain KA is an inverse number of the variable gain KB and control is so made as to satisfy the following relation:

$$KA \times KB = 1 \quad (1)$$

Next, the flow of signals in the control system shown in FIG. 2 will be explained. An error signal (PES) 25 as the difference between the target position signal 24 contained in the command requesting data read/write and the position signal 20 from the magnetic head 1 is inputted to the servo compensator Cf(z) and to the variable gain device A31. The output of the variable gain device A31 is inputted to the resonance filter 30 and the output of the resonance filter 30 is inputted to the variable gain device B32. The output 33 of the variable gain device B32 is added to the output of a following compensator Cf(z) as the servo compensator 29 and the signal after this addition is a VCM control signal and is inputted to the control object P(z).

FIG. 3 is a block diagram showing a construction of a seek control system realized by MPU 16. Now, the seek control system will be explained with reference to FIG. 3. Here, a head position signal 20, a head acceleration signal 34 and a head speed signal 35 are acquired from the control object 27. These signals are inputted to a seek controller 36. The seek controller 36 outputs a seek control signal 37 that moves the magnetic head to the target track. The input to the variable gain device A31 and the input to the resonance filter 30 are both made 0 during the seek operation. As a result, the resonance filter 30 outputs free response having internal variables of the resonance filter 30 at the start of the seek operation as initial values. The output of the resonance filter 30 is inputted to the variable gain device B32 and the output of the variable gain device B32 is added to the seek control signal 37. The signal after this addition is the VCM control signal and is inputted to the control object P(z).

FIGS. 4A and 4B show the frequency characteristics of the gain and phase of the control object P(z) 27 in the first embodiment of the invention and the numerical formula model of the following control system 28 shown in FIG. 2 will be explained. It will be assumed that the control object P(z) 27 has the transfer characteristics exhibiting the frequency response to the gain shown in FIG. 4A and the frequency response to the phase shown in FIG. 4B. Such characteristics are those which ordinary hard disk drives have.

It can be understood from the characteristics shown in FIGS. 4A and 4B that the control object P(z) has characteristics such that a rigid body mode is dominant at a frequency below 2 kHz and mechanical resonance characteristics is dominant at a frequency above 3 kHz. It will be assumed further that a sampling time for detecting the head position signal is 38 µs.

In the first embodiment of the invention, the servo compensator Cf(z) 29 of the following control system 28 is designed for the control object P(z) having the characteristics described above in such a fashion as to possess the following characteristics. Namely, integration characteristics of the first order are given in a low frequency range so as to prevent a steady error from occurring even when external force acts on the control system. To stabilize the rigid body mode, phase advance characteristics are given so that the phase advance is great in a range of 200 Hz to 3 kHz. Furthermore, because the mechanical resonance characteristics existing near 4 kHz can be stabilized by phase delay elements, a notch filter for delaying the phase near 4 kHz is given to 4.5 kHz frequency. Gain characteristics are given to the gain of the servo compensator 29 so that the crossover frequency (frequency at which an amplitude ratio of input and output becomes 1) at a gain 0 dB in P(z)·Cf(z) is 1000 Hz.

FIGS. 5A and 5B show the frequency characteristics of the gain and phase of the servo compensator Cf(z) 29 in the first embodiment of the invention. FIG. 5A shows the frequency characteristics of the gain and FIG. 5B shows the frequency characteristic of the phase. The frequency characteristics of the servo compensator Cf(z) shown in FIGS. 5A and 5B are those of the gain and phase of the servo compensator Cf(z) 29 when the servo compensator 29 is designed in the manner explained above.

FIGS. 6A and 6B show the frequency characteristics of the gain and phase of the resonance filter Cr(z) 30 in the first embodiment of the invention. FIG. 6A shows the frequency characteristics of the gain and FIG. 6B shows the frequency characteristic of the phase. Next, the resonance filter Cr(z) 300 will be explained.

It will be assumed here that the target disturbance of the resonance filter Cr(z) 30 is disk flutter. The disk flutter is oscillation that occurs when the disk is excited by fluid-associated oscillation and its oscillation mode is expressed by a set (m, n) of the number m of nodal circles and the number n of node diameters. Furthermore, because the disk is rotating, the oscillation resulting from the disk flutter is observed on the error signal PRS25 while being divided into the frequency component of forward rotation and the frequency component of backward rotation. When the number of the nodal circles is greater than 1, the oscillation mode observed in practice as the disk flutter is the one having the number of nodal circle of 1 because the natural frequency is relatively high. As a result, the oscillation resulting from the disk flutter becomes the response having substantially the same phase on the same disk surface and its amplitude changes in accordance with the distance from the disk center. Generally, the amplitude is small at the inner circumference and great at the outer circumference.

It will be assumed that the number of revolutions of the disk is 10,000 rpm and the oscillation mode of the disk flutter exists at 1250 kHz (backward) and 1583 kHz (forward). Transfer characteristics with the frequency response shown in FIG. 6 are given as the resonance filter Cr(z) 30 for compensating the oscillation resulting from these disk flutters in the first embodiment of the invention. When such a resonance filter Cr(z) 30 is applied, the following equation is given as the transfer characteristics of the following control system is KA×KB=1:

$$Cf(z)+Cr(z) \tag{2}$$

FIGS. 7A and 7B show the frequency characteristics of the open loop transfer characteristics of the following control system according to the first embodiment of the invention. FIG. 7A shows the frequency characteristics of the gain and FIG. 7B does the frequency characteristics of the phase. FIG. 8 shows a vector locus (Nyquist diagram) of the open loop transfer characteristics of the following control system in the first embodiment of the invention and FIG. 9 shows the gain characteristics of the sensitivity function of the following control system of the first embodiment. In other words, FIGS. 7A, 7B, 8 and 9 show the frequency characteristics of the open loop transfer characteristics of the following control system, the vector locus of the open transfer characteristics and the gain characteristic of the sensitivity function when the transfer characteristics explained with reference to FIGS. 6A and 6B are given to the servo compensator 29 of the following control system 29 shown in FIG. 2 and the transfer characteristics explained with reference to FIGS. 6A and 6B are given to the resonance filter 30.

It can be understood from FIGS. 7A, 7B and 8 that owing to the effect of the resonance filter, the open loop transfer characteristics of the following control system have the resonance characteristics at 1260 Hz and 1583 Hz at which the disk flutter exists and that the vector locus of the resonance characteristics describes a dextrorotary circular locus in a direction away from coordinates (−1, 0) as an unstable point. It can be also understood from the gain characteristics of the sensitivity function shown in FIG. 9 that the resonance filter improves the sensitivity function gain at 1250 Hz and 1583 Hz at which the disk flutter exists in the control system.

Next, the effects of the first embodiment of the invention will be explained.

FIG. 10 is a graph showing the change of the amplitude of the disk flutter oscillation corresponding to the head position of the hard disk drive as an example for explaining the effects of the first embodiment of the invention, FIG. 11 is a graph showing the oscillation characteristics of the head as the simulation result when seek control is carried out by moving the head from the track of the outermost circumference to the track of the innermost circumference and FIG. 12 is a graph showing the simulation result of the disk flutter oscillation at the head position in the first embodiment of the invention.

It will be assumed that the head position corresponding to the track of the outermost circumference is 0 mm and the head position corresponding to the track of the innermost circumference is 20 mm. It will be assumed further that the amplitude of the disk flutter as the object changes as shown in FIG. 10 in accordance with the head position when the amplitude at the track of the outermost circumference is 1. Therefore, KB (variable gain device B) is so set as to possess the same characteristics as those shown in FIG. 10. KA (variable gain device A) is so set as to possess the characteristics satisfying the formula (I) given above. Incidentally, FIG. 10 is for confirming the effects of the embodiment of the invention. In practice, the characteristic of a hard disk drive actually produced is measured and used.

Simulation is carried out to confirm the effects of the first embodiment of the invention by conducting seek control for moving the head from the track of the outermost circumference to the track of the innermost circumference. The seek control is made from time 0 to time 7.5 ms. At this time, the head position moves as shown in FIG. 11 owing to the seek control system. The disk flutter oscillation at the head position changes as shown in FIG. 12 with the movement of the head. In this case, the input to the resonance filter Cr(z) is 0 from the time 0 to 7.5 ms as the seek operation time.

FIGS. 13A and 13B show the simulation result of the output from the variable gain device B in the first embodiment of the invention (FIG. 13A) and the output from the variable gain device B when the gain of the variable gain device B is fixed at 1 without using the invention (FIG. 13B).

It can be understood from FIGS. 13A and 13B that the amplitude of the output of the variable gain device B becomes rapidly smaller in accordance with the head position when the invention is used. It can be understood also that the output from the variable gain device B becomes the same as the output from the resonance filter Cr(z) when the invention is not used and that although the output slightly attenuates because the input to the resonance filter is 0, the change is smaller than when the invention is used.

FIGS. 14A and 14B show the result of the error signal in the proximity of the target track in the first embodiment of the invention (FIG. 14A) and the result of the error signal PES when the gain of the variable gain device B is fixed at 1 without using the invention (FIG. 14B).

It can be understood from FIGS. 14A and 14B that when the invention is not used, oscillation corresponding to the frequency of the disk flutter is great in the proximity of the target value. This is the phenomenon that occurs because the amplitude of the disk flutter oscillation is different between the seek start position and the seek finish position. It can be understood that when the invention is used, on the other hand, the effect of the variable gain device B improves the oscillation characteristics in the proximity of the target track because the control input compensating the oscillation of the disk flutter changes in accordance with the head position.

The first embodiment of the invention given above deals with the seek control for moving the head from the track of the outermost circumference to the track of the innermost circumference. Now, a seek control for moving the head from the track of the innermost circumference to the track of the outermost circumference will be explained as the second embodiment of the invention. By the way, the basic construction of the hard disk drive is the same as that of the first embodiment of the invention.

FIG. 15 shows the head movement characteristics as the simulation result when seek control is executed by moving the head from the track of the innermost circumference to the track of the outermost circumference in a hard disk drive according to a second embodiment of the invention. FIG. 16 shows the simulation result of the disk flutter oscillation at the head position in the second embodiment.

Simulation is carried out to confirm the effects of the second embodiment of the invention by conducting seek control for moving the track head from the track of the innermost circumference to the track of the outermost circumference. In this case, the seek control is made from time 0 to time 7.5 ms in the same way as in the case of FIG. 11. At this time, the head position moves as shown in FIG. 15 owing to the seek control system. The disk flutter oscillation at the head position changes as shown in FIG. 16 with the movement of the head. In this case, too, the input to the resonance filter Cr(z) is 0 from the time 0 to 7.5 ms as the seek operation time.

FIGS. 17A and 17B show the simulation result of the output from the variable gain device B in the second embodiment of the invention (FIG. 17A) and the result of the output from the variable gain device B when the gain of the variable gain device B is fixed at 1 without using the invention (FIG. 17B).

It can be understood from FIGS. 17A and 17B that the amplitude of the output of the variable gain device B becomes drastically greater in accordance with the head position when the invention is used. It can be understood also that the output from the variable gain device B becomes the same as the output from the resonance filter Cr(z) when the invention is not used and the output slightly attenuates as the input to the resonance filter is made 0.

FIGS. 18A and 18B show the result of the error signal in the proximity of the target track in the second embodiment of the invention (FIG. 18A) and the result of the error signal PES when the gain of the variable gain device B is fixed at 1 without using the invention (FIG. 18B).

It can be understood from FIGS. 18A and 18B that the oscillation characteristics are improved in the proximity of the target track because the control input compensating the oscillation of the disk flutter changes in accordance with the head position when the invention is used.

The first embodiment of the invention has been explained on the assumption that the subject oscillation results from the disk flutter. Next, an example where the subject oscillation is a rotation-synchronous oscillation that is synchronous with the number of revolutions of the disk will be explained as the third embodiment of the invention. Incidentally, the basic construction of the hard disk drive is the same as that of the first embodiment of the invention.

The rotation-synchronous oscillations are detected as line spectrum components of oscillation that are integer multiple of the number of revolutions of the disk. The causes for the occurrence are diversified. There exists a rotation-synchronous oscillation that has substantially the same phase on the same disk surface and its amplitude changes in accordance with the distance from the disk center. In this case, the amplitude is ordinarily great on the inner circumference and small on the outer circumference. The third embodiment of the invention will be explained on the assumption that such rotation-synchronous oscillation exists at 1667 Hz.

FIGS. 19A and 19B show the frequency characteristics of each of the gain and phase of the resonance filter Cr(z) 30 in the third embodiment of the invention. FIG. 19A shows the frequency characteristics of the gain and FIG. 19B does the frequency characteristics of the phase.

In the third embodiment of the invention, the transfer characteristics having a frequency response shown in FIGS. 19A and 19B are given as the resonance filter Cr(z) compensating the rotation-synchronous oscillation existing at 1667 Hz.

FIGS. 20A and 20B show the frequency characteristics of the open loop transfer characteristics of the following control system according to the third embodiment of the invention. FIG. 20A shows the frequency characteristics of the gain and FIG. 20B does the frequency characteristics of the phase. FIG. 21 shows a vector locus (Nyquist diagram) of the open loop transfer characteristics and FIG. 22 shows the gain characteristics of the sensitivity function of the following control system of the third embodiment of the invention.

When the transfer characteristics having the frequency response shown in FIGS. 19A and 19B are given to the resonance filter Cr(z), the frequency response of the open loop transfer characteristics realized by the following control system becomes the one shown in FIGS. 20A and 20B and the Nyquist diagram becomes the one shown in FIG. 21. It can be understood from FIGS. 20A, 20B and 21 that owing to the effect of the resonance filter, the open loop transfer characteristics of the following control system have the resonance characteristics at 1667 Hz at which the rotation-synchronous oscillation exists and that the vector locus of the resonance characteristics shows a dextrorotary circular locus in a direction away from coordinates (−1, 0) as an unstable point. The gain characteristics of the sensitivity function of the following control system are shown in FIG. 22. It can be understood from FIG. 22 that the control system improves, by its resonance filter, the sensitivity function gain at 1667 Hz at which the disk flutter exists.

FIG. 23 shows an example of the change of the amplitude of the rotation-synchronous oscillation of interest corresponding to the head position of the hard disk drive in the third embodiment.

It will be assumed that when the amplitude is 1 at the innermost track 1 in the rotation-synchronous oscillation of interest, the amplitude changes as shown in FIG. 23 in accordance with the head position. Therefore, KB (variable gain device B) is so set as to possess the same characteristics as those shown in FIG. 23 and KA (variable gain device A) is so set as to satisfy the formula (1) described above.

FIG. 24 shows the simulation result of the rotation-synchronous oscillation at the head position in the third embodiment.

Simulation is carried out to confirm the effects of the third embodiment of the invention by conducting seek control for moving the head from the track of the outermost circumference to the track of the innermost circumference. As a result, the rotation-synchronous oscillation at the head position changes as shown in FIG. 24 with the movement of the head.

FIGS. 25A and 25B show the simulation result of the output from the variable gain device B in the third embodiment of the invention (FIG. 25A) and the result of the output from the variable gain device B when the gain of the variable gain device B is fixed at 1 without using the invention (FIG. 25B).

It can be understood from FIGS. 25A and 25B that the amplitude of the output of the variable gain device B becomes drastically greater in accordance with the head position when the invention is used. It can be understood also that the output from the variable gain device B hardly changes when the invention is not used.

FIGS. 26A and 26B show the result of the error signal in the proximity of the target track in the third embodiment of the invention (FIG. 26A) and the result of the error signal PES when the gain of the variable gain device B is fixed at 1 without using the invention (FIG. 26B).

It can be understood from FIGS. 26A and 26B that when the invention is not used, the oscillation corresponding to the frequency of the rotation-synchronous oscillation is great in the proximity of the target value. This is the phenomenon that occurs because the amplitude of the rotation-synchronous oscillation is different between the seek start position and the seek finish position. When the invention is used, on the other hand, the oscillation characteristics are improved in the proximity of the target track owing to the effect of the variable gain B because the control input compensating the rotation-synchronous oscillation changes in accordance with the head position.

The afore-mentioned first embodiment of the invention has been explained on the assumption that the variable gain varies in accordance with the head position during the seek operation. Next, an example where the variable gain is allowed to vary in accordance with the target head position at the time of the seek operation of the head will be explained as the fourth embodiment of the invention. Incidentally, the basic construction of the hard disk drive is the same as that of the afore-mentioned first embodiment of the invention.

In the fourth embodiment of the invention, the value of the variable gain before the start of the seek operation of the head has the gain at the head position at the start of the seek operation and is changed to the gain of the target head position for the seek operation at the start or during the seek operation. In consequence, derivation and change of the variable gain can be made only once per seek operation and the operation can be simplified.

FIGS. 27A and 27B show the simulation result of the output from the variable gain device B in the fourth embodiment of the invention (FIG. 27A) and the result of the output from the variable gain device B when the gain of the variable gain device B is fixed at 1 without using the invention (FIG. 27B). It can be understood from FIGS. 27A and 27B that the amplitude of the output from the variable gain device B using the invention becomes drastically great from the start of the seek operation.

FIG. 28 is a block diagram showing another structural example of the following control system realized by MPU 16.

The afore-mentioned first embodiment has been explained about the construction in which the variable gain device A 31 in the following control system is connected to the input side of the resonance filter 30, the variable gain device B is connected to the output side of the resonance filter 30 and the whole series circuit (resonance filter with variable gain) is connected in parallel with the servo compensator 29. However, the invention can also be constituted by a circuit in which the resonance filter with variable gain is connected in series with the servo compensator and in this case, too, the similar effect can be acquired in the same way as in each of the foregoing embodiments.

As explained above, each of the embodiments of the invention can allow the head position to follow at a high speed the disturbance oscillation after the seek control of the head even when the disturbance oscillation, the oscillation amplitude of which changes in accordance with the distance from the disk center, occurs in the control system.

Consequently, each of the embodiments can suppress at a high speed the disturbance oscillation occurring at a specific frequency in the positioning control system of the head in the hard disk drive and can allow the head to correctly follow the recording track. While the invention has been described about some preferred embodiments thereof, it would be obvious to those skilled in the art that various changes and modifications can be made thereto without departing from the spirit of the invention.

Figure 1:
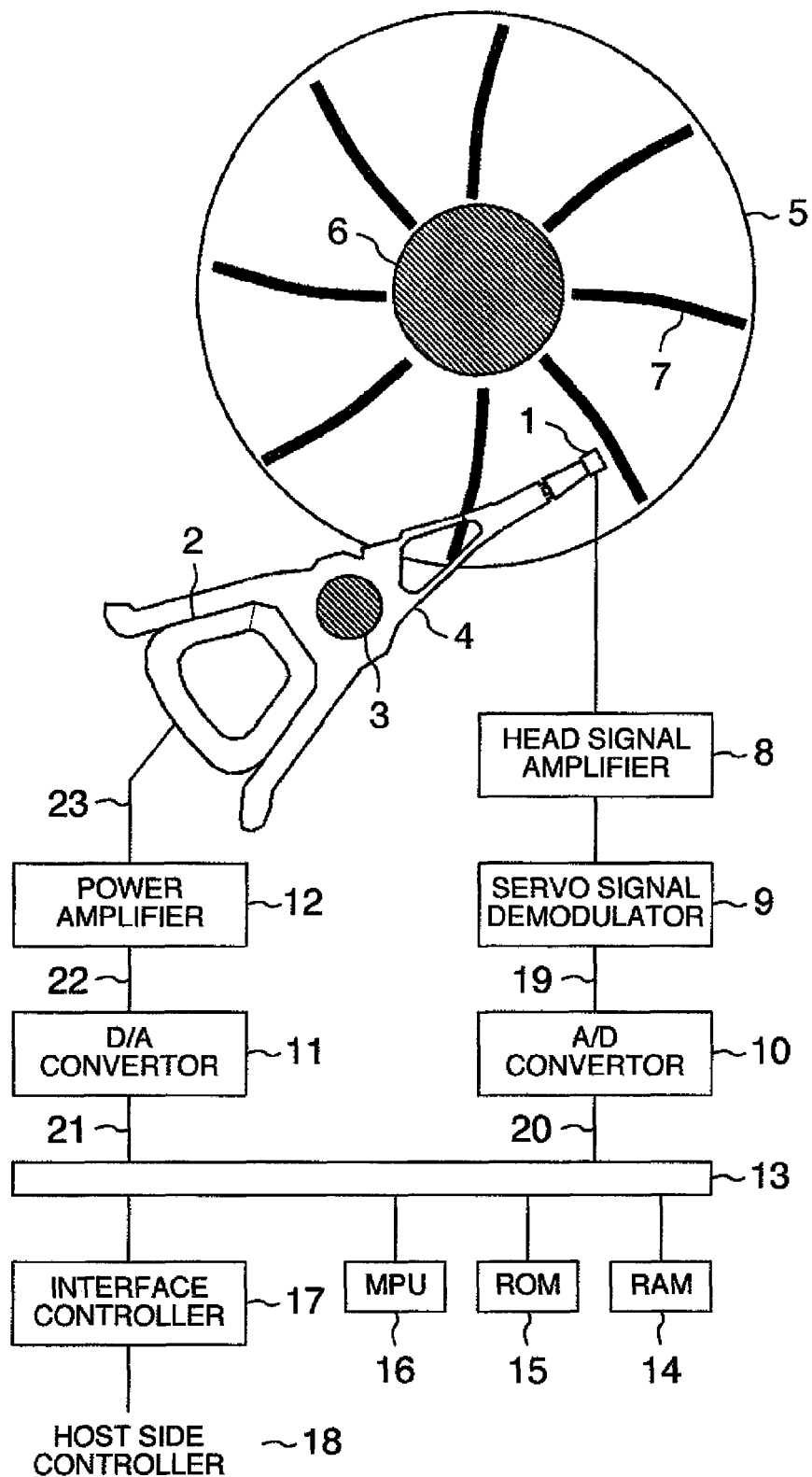
FIG. 1 is a block diagram showing a basic construction of a hard disk drive according to a first embodiment of the invention.
Figure 2:
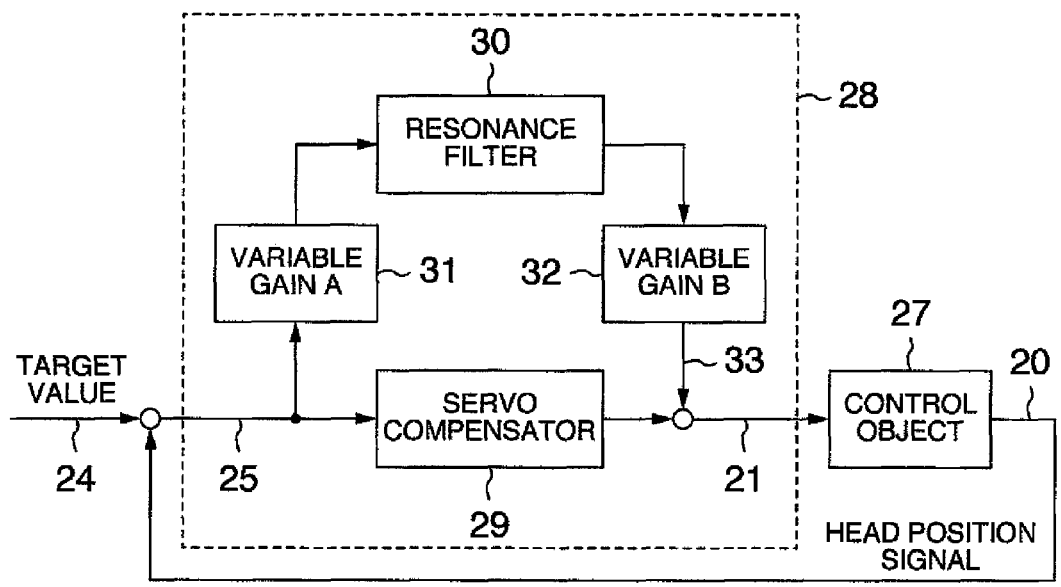
FIG. 2 is a block diagram showing a construction of a following control system realized by MPU.
Figure 3:
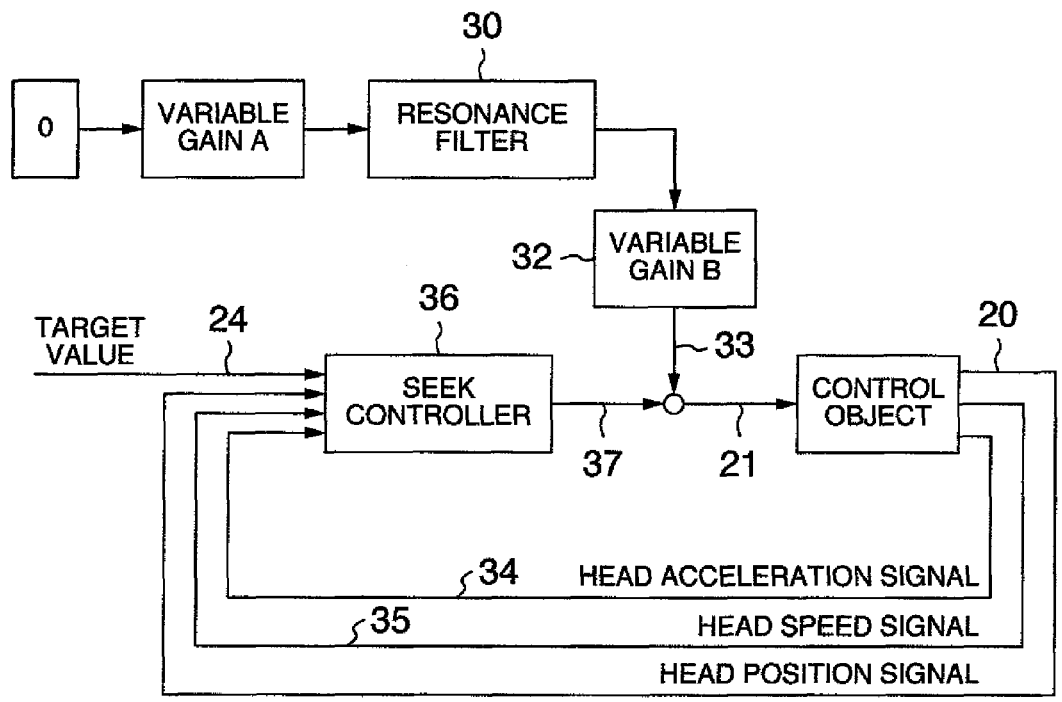
FIG. 3 is a block diagram showing a construction of a seek control system realized by MPU.
Figure 4A:
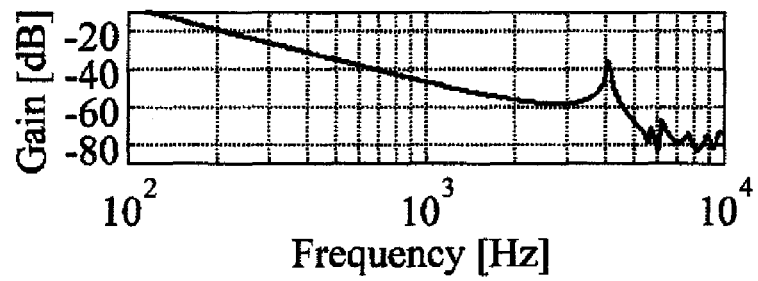
FIG. 4A is a graph showing frequency characteristics of a gain of a control object $P(z)$ in a first embodiment of the invention.
Figure 4B:
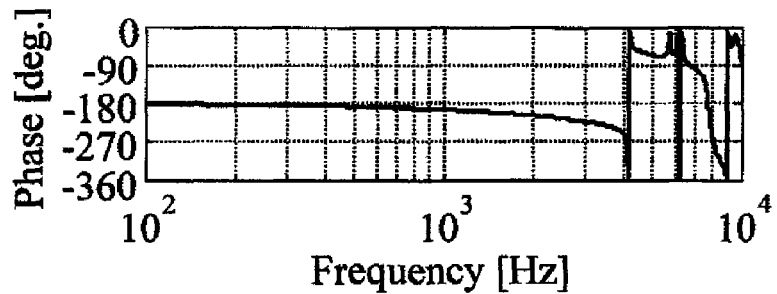
FIG. 4B is a graph showing frequency characteristics of a phase of the control object $P(z)$ in the first embodiment of the invention.
Figure 5A:
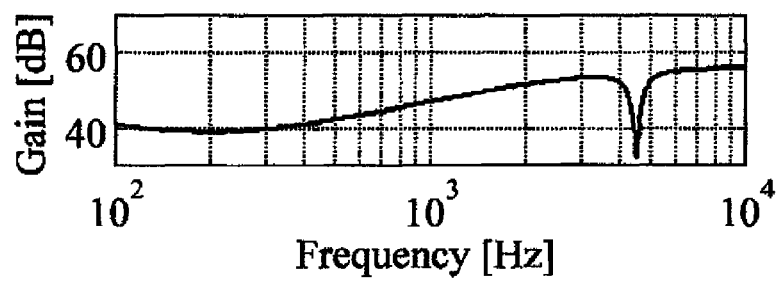
FIG. 5A is a graph showing frequency characteristics of a gain of a servo compensator $Cf(z)$ in the first embodiment of the invention.
Figure 5B:
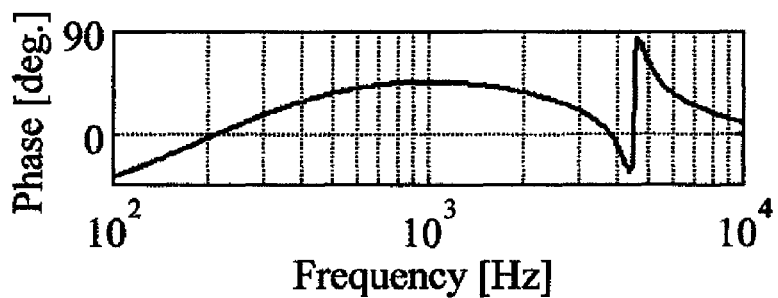
FIG. 5B is a graph showing frequency characteristics of a phase of the servo compensator $Cf(z)$ in the first embodiment of the invention.
Figure 6A:
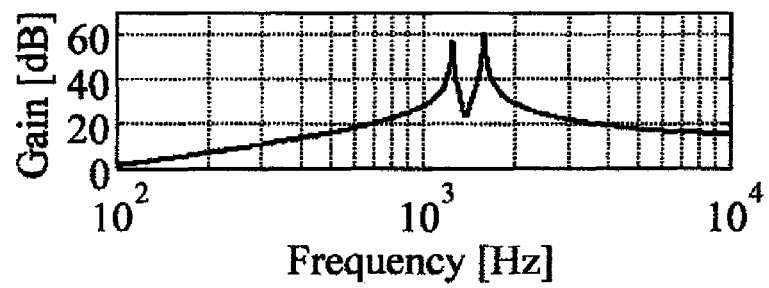
FIG. 6A is a graph showing frequency characteristics of a gain of a resonance filter $Cr(z)$ in the first embodiment of the invention.
Figure 6B:
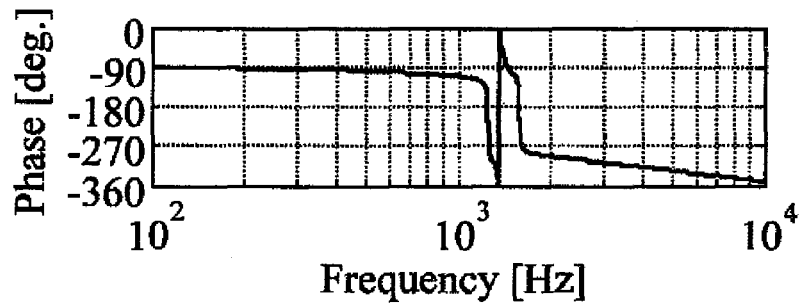
FIG. 6B is a graph showing frequency characteristics of a phase of the resonance filter $Cr(z)$ in the first embodiment of the invention.
Figure 7A:
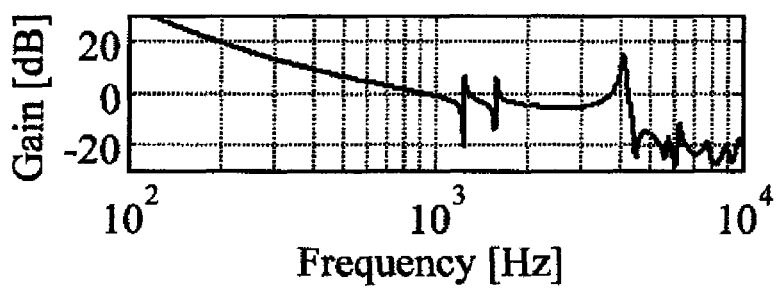
FIG. 7A is a graph showing frequency characteristics of a gain of open loop transfer characteristics of a following control system in the first embodiment of the invention.
Figure 7B:
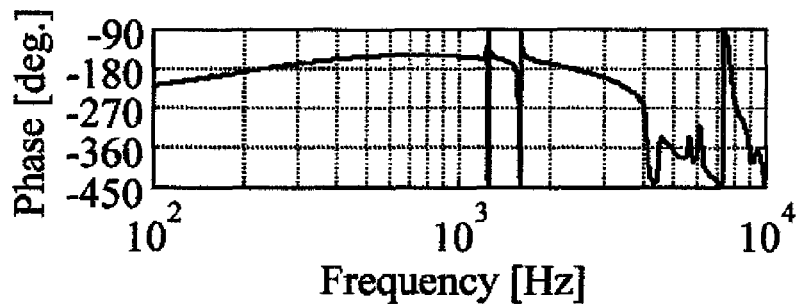
FIG. 7B is a graph showing frequency characteristics of a phase of the open loop transfer characteristics of the following control system in the first embodiment of the invention.
Figure 8:
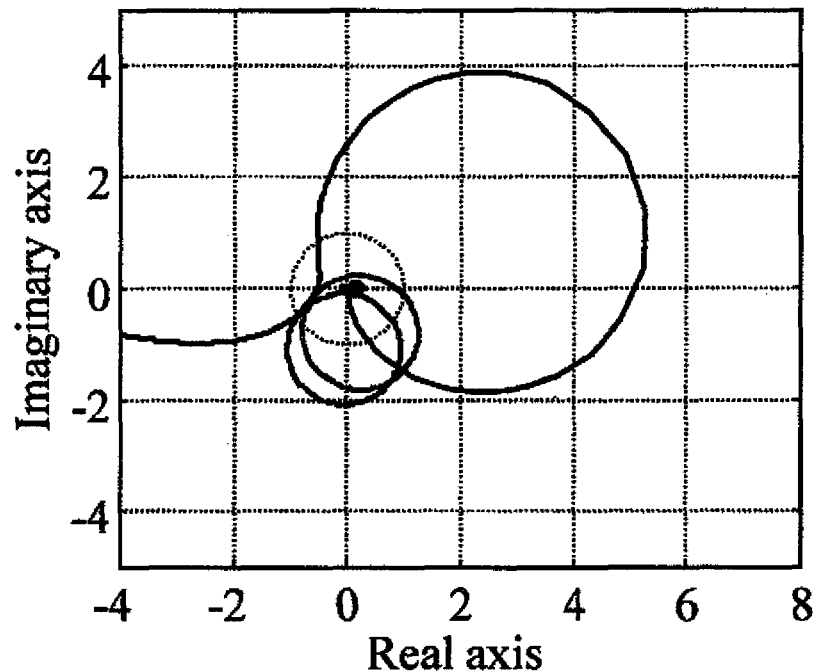
FIG. 8 is a graph showing a vector orbit (Nyquist diagram) of the open loop transfer characteristics of the following control system in the first embodiment of the invention.
Figure 9:
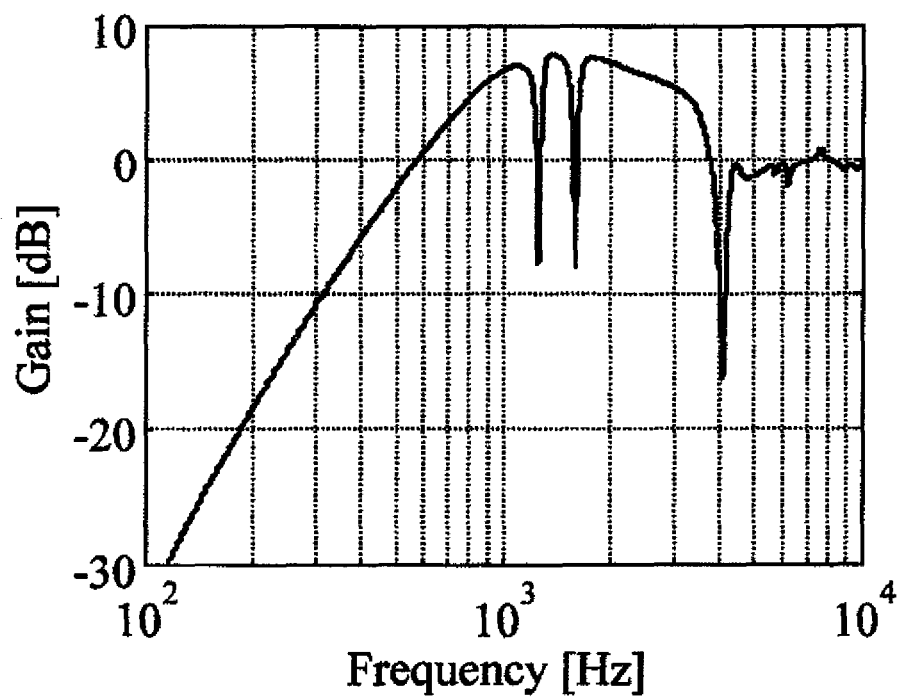
FIG. 9 is a graph showing gain characteristics of a sensitivity function of the following control system in the first embodiment of the invention.
Figure 10:
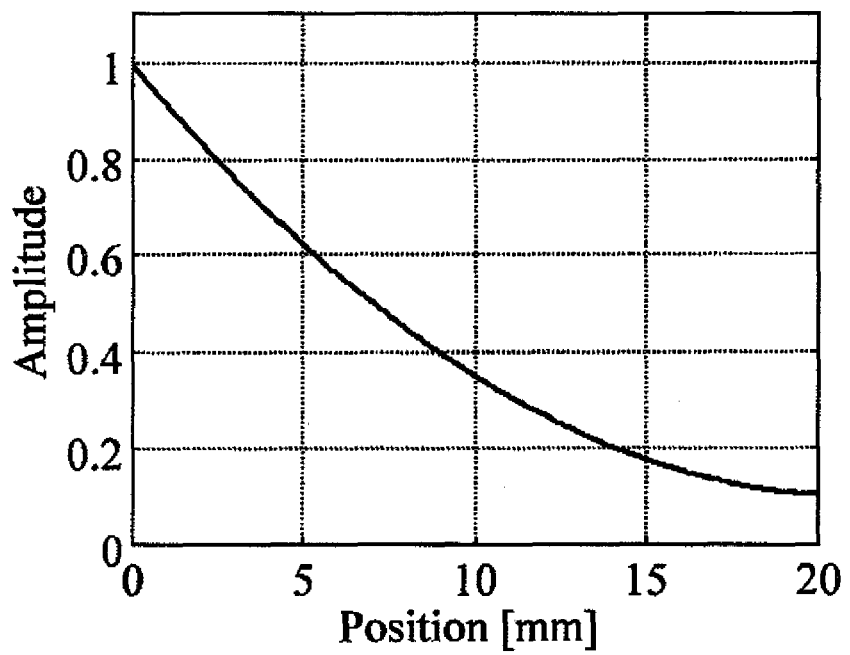
FIG. 10 is a graph showing an example of the change of amplitude of disk flutter oscillation in accordance with a head position of a hard disk drive as an example for explaining the effect of the first embodiment of the invention.
Figure 11:
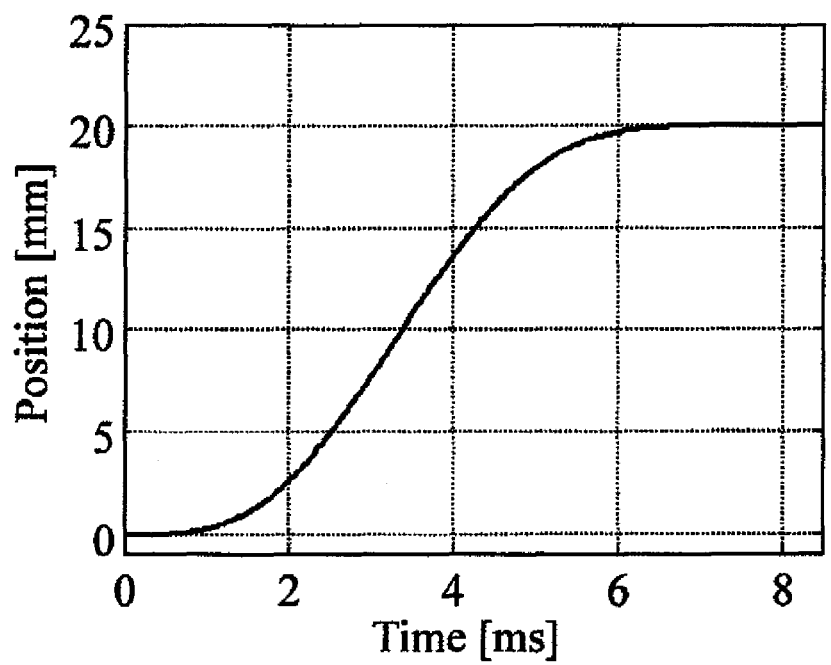
FIG. 11 is a graph showing movement characteristics of the head as a simulation result when seek control is executed by moving the head from the outermost track to the innermost track in the hard disk drive in the first embodiment of the invention.
Figure 12:
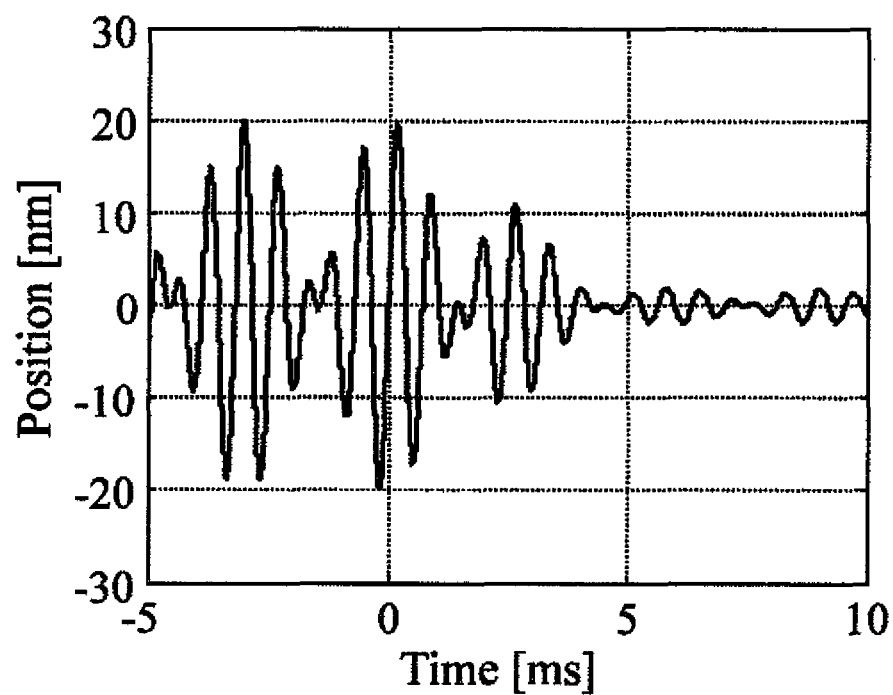
FIG. 12 is a graph showing a simulation result of disk flutter oscillation at a head position in the first embodiment of the invention.
Figure 13A:
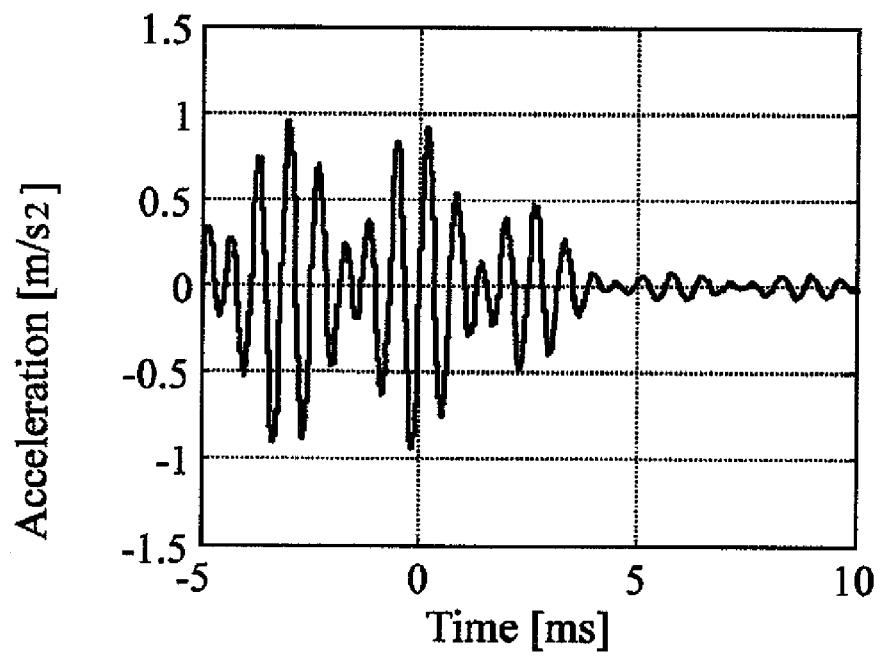
FIG. 13A is a graph showing a simulation result of an output from a variable gain device B in the first embodiment of the invention.
Figure 13B:
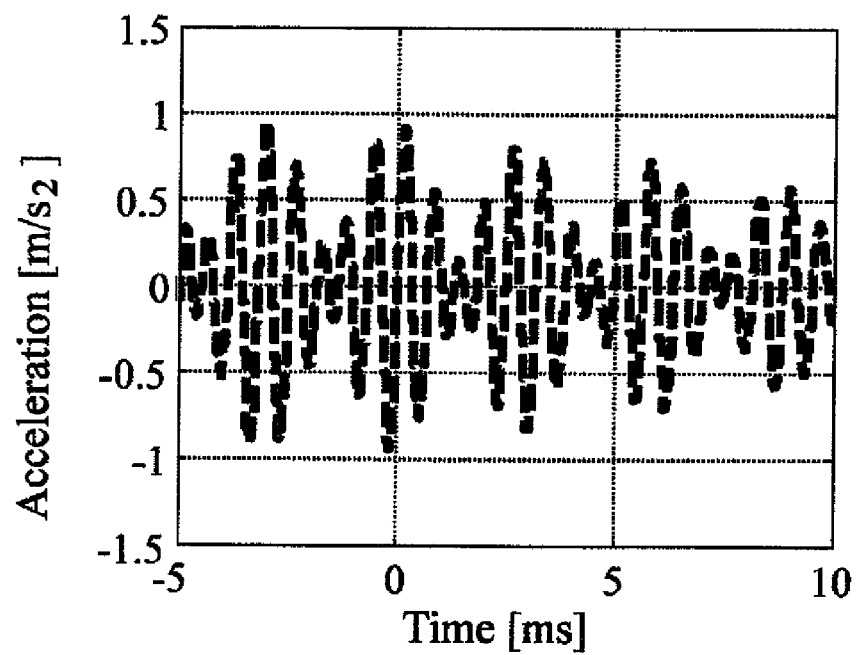
FIG. 13B is a graph showing a simulation result of an output from the variable gain device B when the gain thereof is fixed at 1 without using the invention.
Figure 14A:
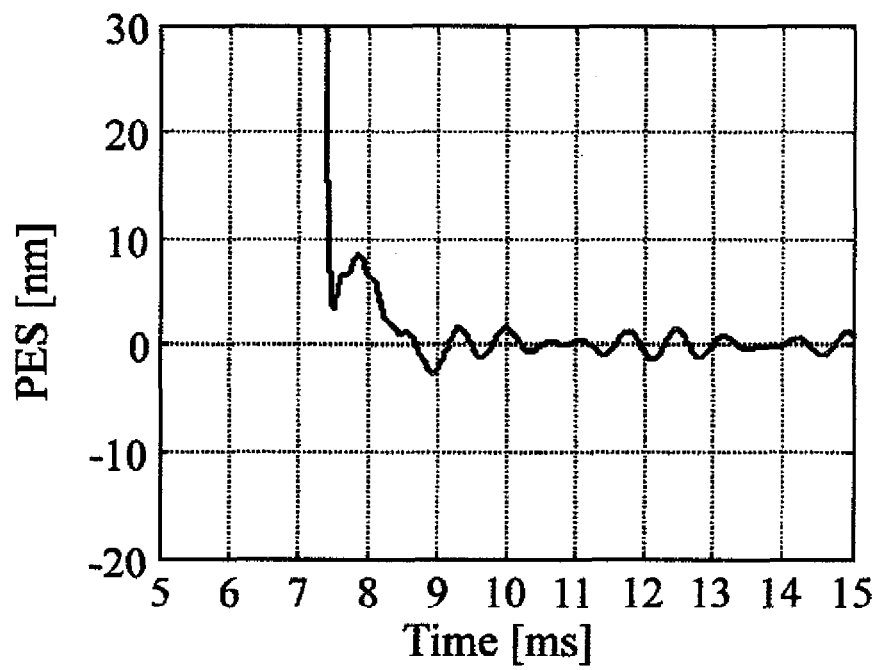
FIG. 14A is a graph showing a result of an error signal in the proximity of a target track in the first embodiment of the invention.
Figure 14B:
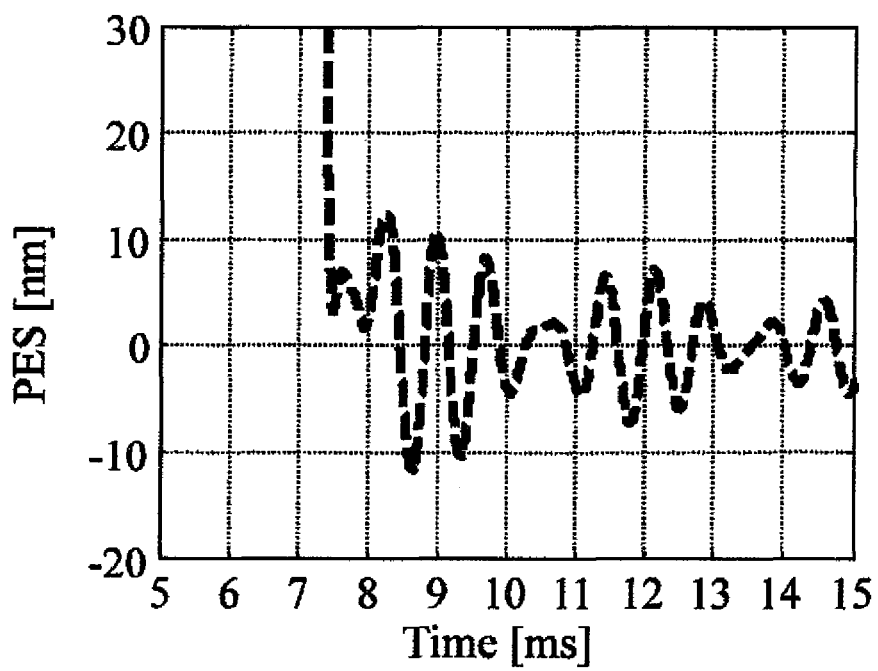
FIG. 14B is a graph showing a result of the error signal PES when the gain of the variable gain device B is fixed at 1 without using the first embodiment of the invention.
Figure 15:
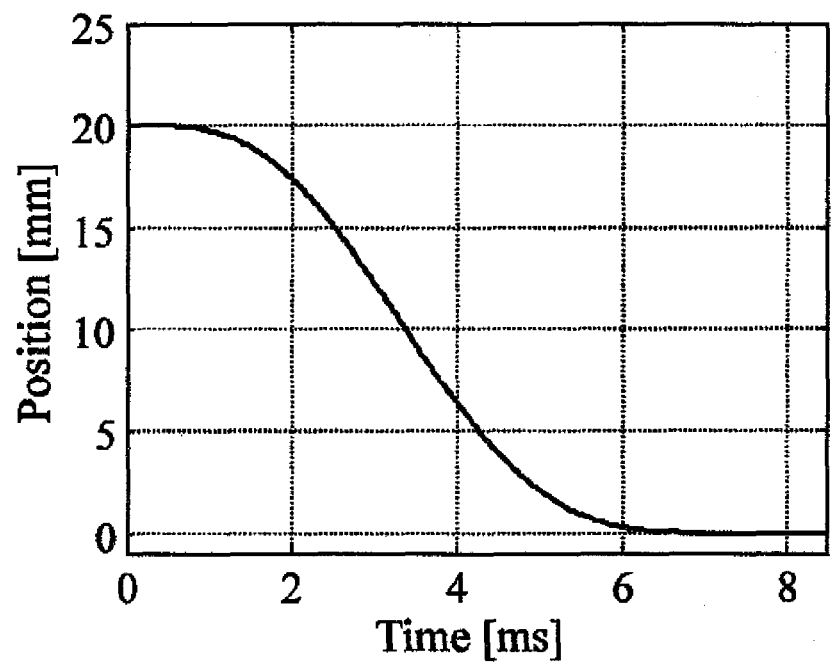
FIG. 15 is a graph showing movement characteristics of the head as a simulation result when seek control is executed by moving the head from the innermost track to the outermost track in the hard disk drive in the second embodiment of the invention.
Figure 16:
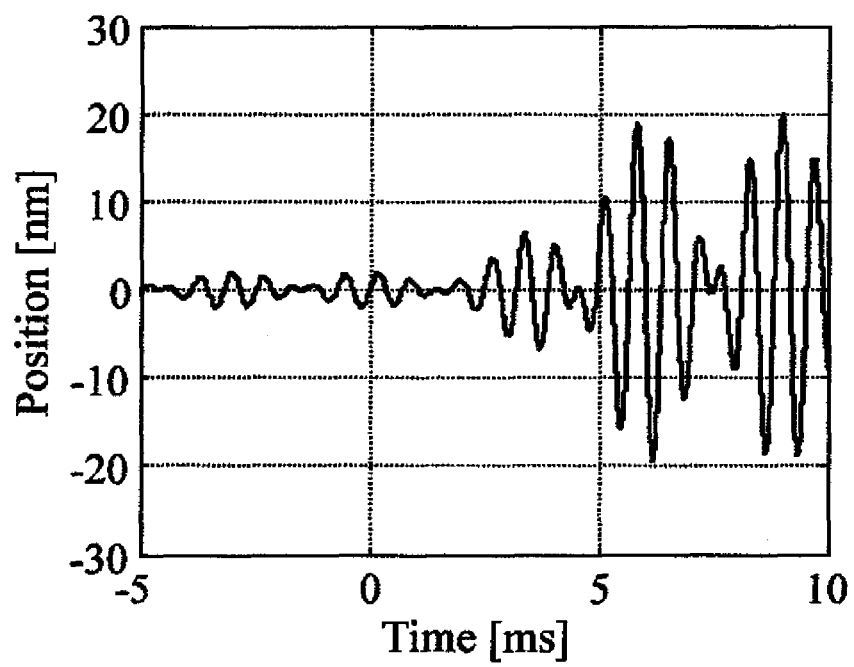
FIG. 16 is a graph showing a simulation result of disk flutter oscillation at a head position in the second embodiment of the invention.
Figure 17A:
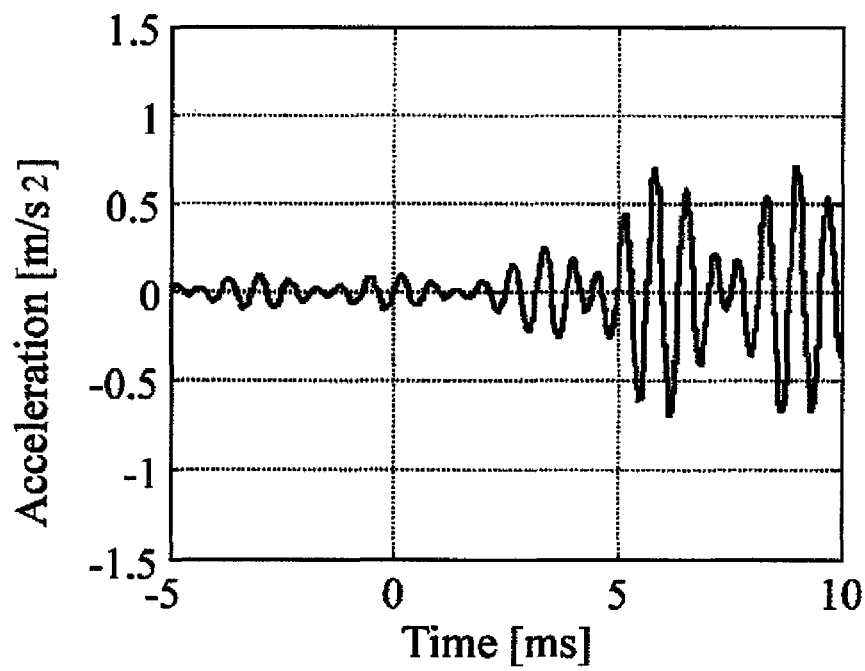
FIG. 17A is a graph showing a simulation result of an output from a variable gain device B in the second embodiment of the invention.
Figure 17B:
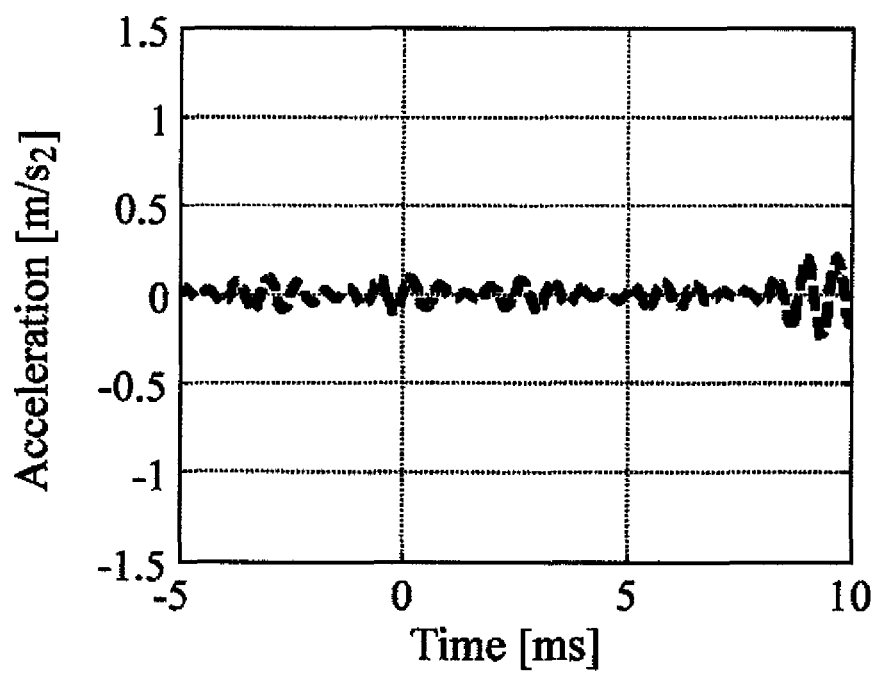
FIG. 17B is a graph showing a result of an output from a variable gain device B when the gain of the variable gain device B is fixed at 1 without using the second embodiment of the invention.
Figure 18A:
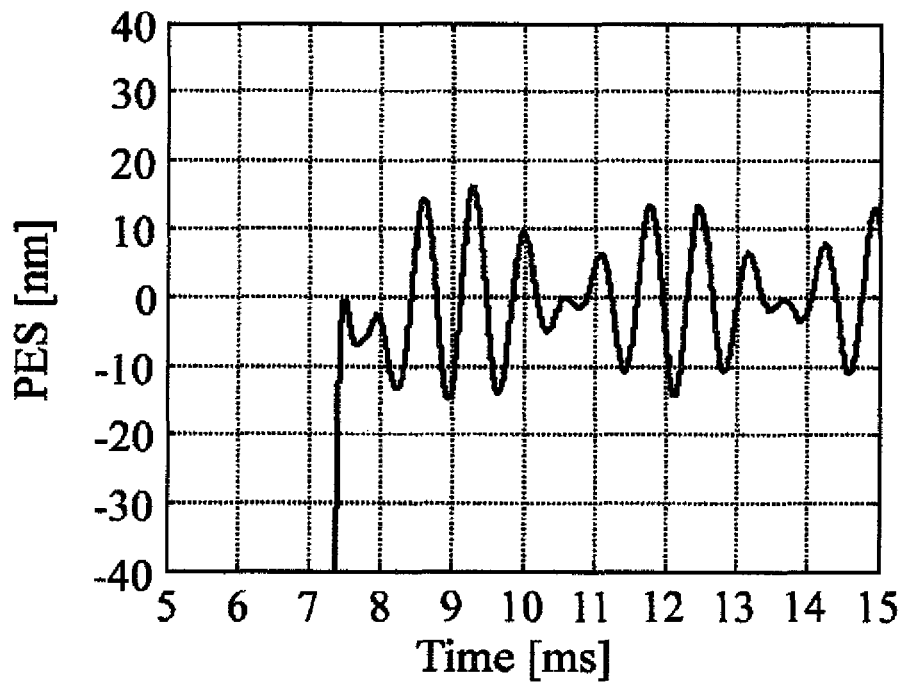
FIG. 18A is a graph showing a result of an error signal in the proximity of a target track in the second embodiment of the invention.
Figure 18B:
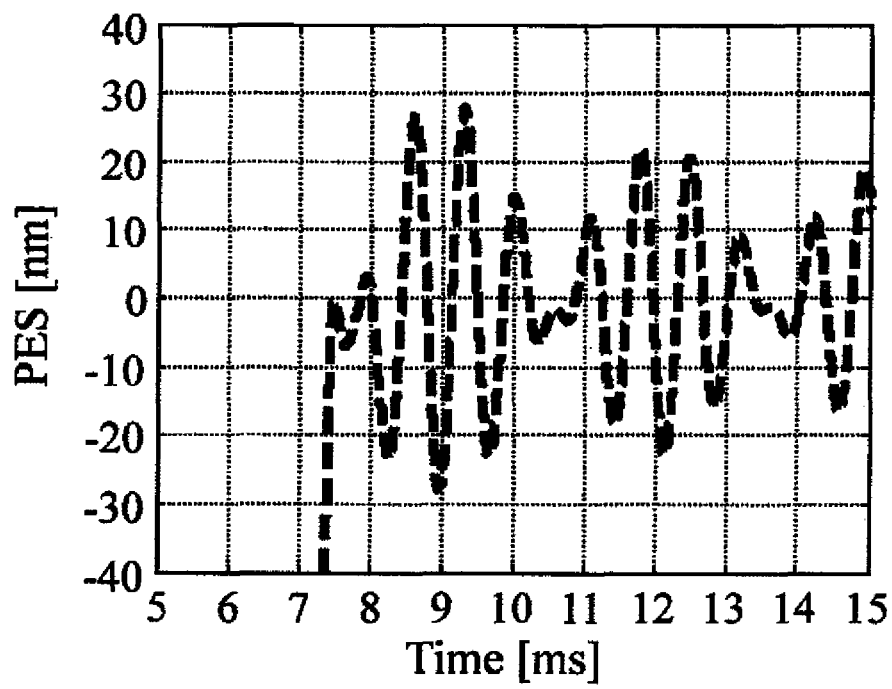
FIG. 18B is a graph showing a result of the error signal PES when the gain of the variable gain device B is fixed at 1 without using the second embodiment of the invention.
Figure 19A:
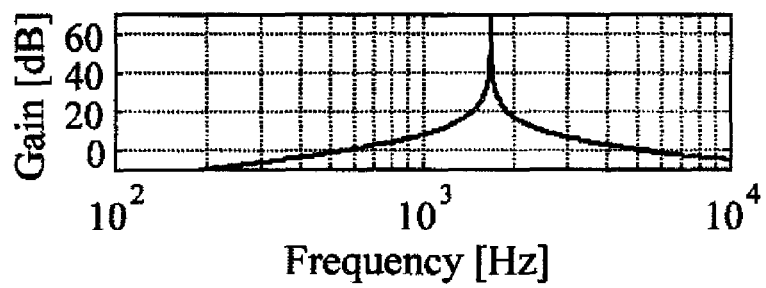
FIG. 19A is a graph showing frequency characteristics of a gain of a resonance filter Cr(z) in the third embodiment of the invention.
Figure 19B:
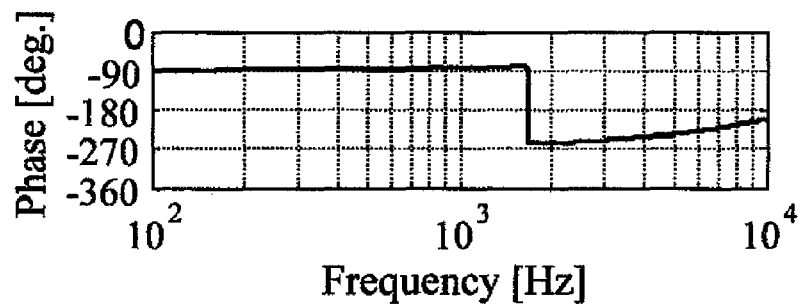
FIG. 19B is a graph showing frequency characteristics of a phase of the resonance filter Cr(z) in the third embodiment of the invention.
Figure 20A:
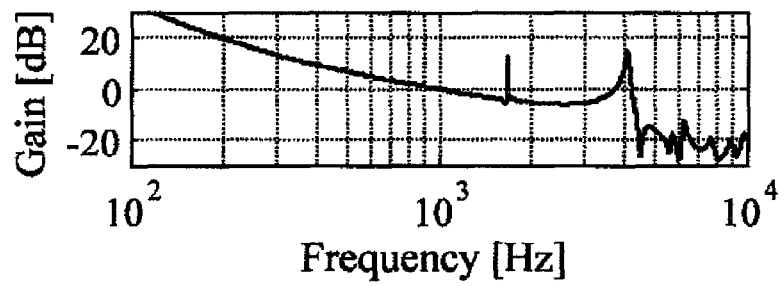
FIG. 20A is a graph showing frequency characteristics of a gain of open loop transfer characteristics of a following control system in the third embodiment of the invention.
Figure 20B:
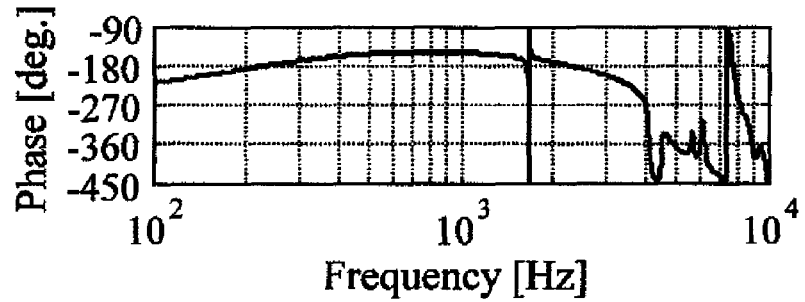
FIG. 20B is a graph showing frequency characteristics of a phase of the open loop transfer characteristics of the following control system in the third embodiment of the invention.
Figure 21:
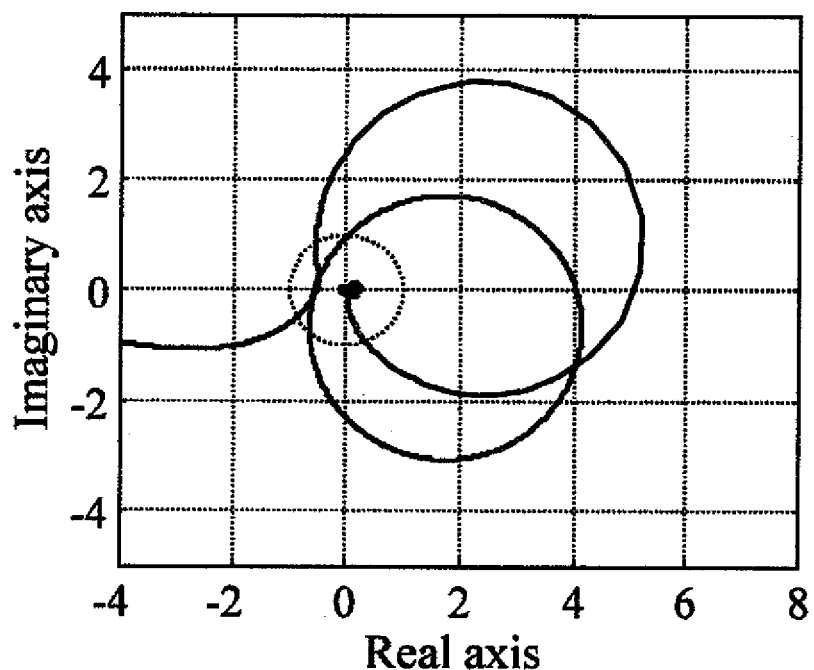
FIG. 21 is a graph showing a vector orbit (Nyquist diagram) of the open loop transfer characteristics of the following control system in the third embodiment of the invention.
Figure 22:
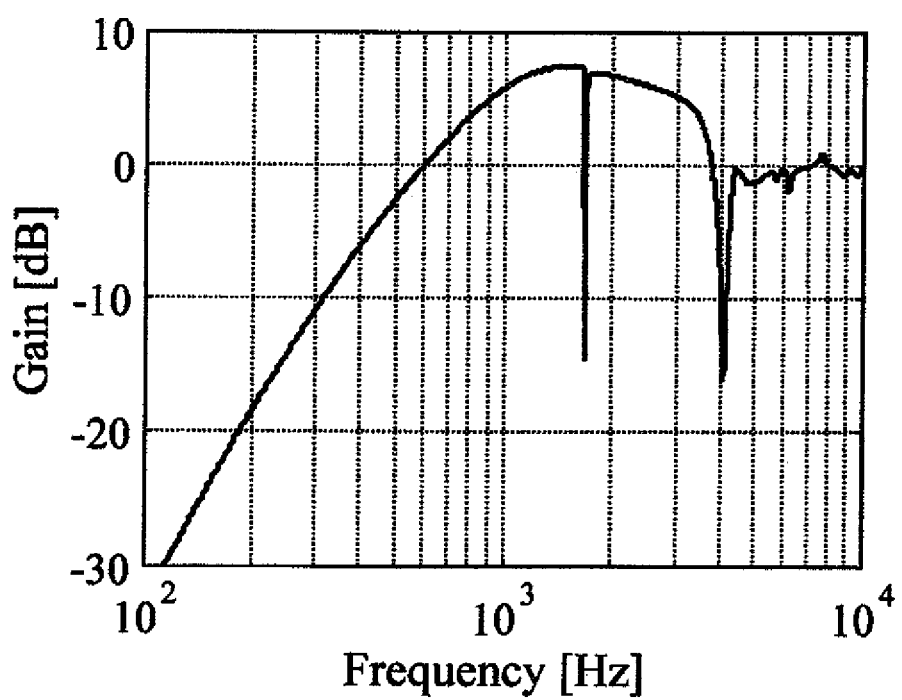
FIG. 22 is a graph showing gain characteristics of a sensitivity function of the following control system in the third embodiment of the invention.
Figure 23:
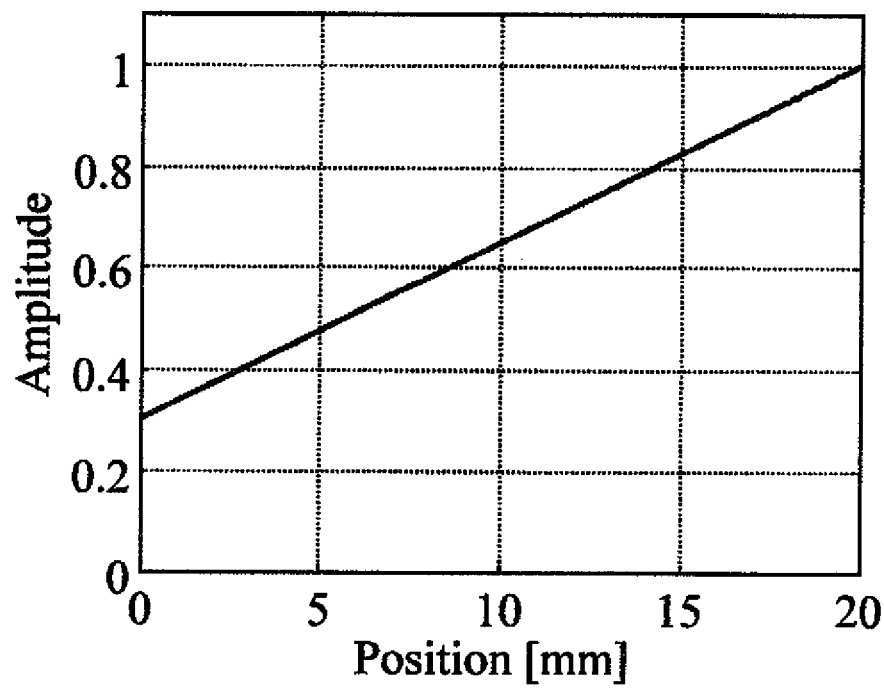
FIG. 23 is a graph showing an example of the change of amplitude of rotation-synchronous oscillation of interest in accordance with a head position of a hard disk drive in the third embodiment of the invention.
Figure 24:
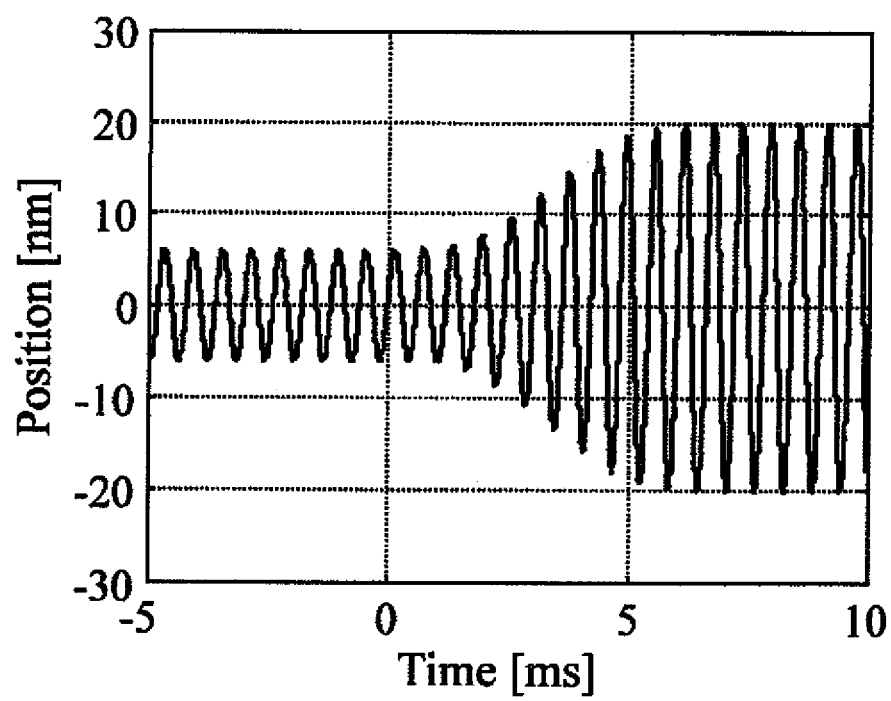
FIG. 24 is a graph showing a simulation result of rotation-synchronous oscillation at a head position in the third embodiment of the invention.
Figure 25A:
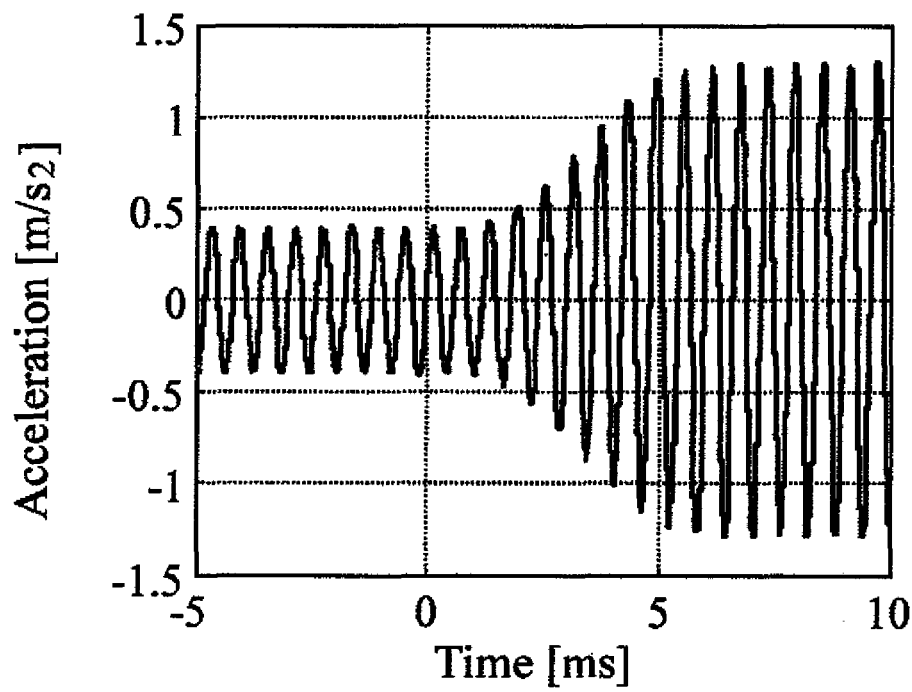
FIG. 25A is a graph showing a simulation result of an output from a variable gain device B in the third embodiment of the invention.
Figure 25B:
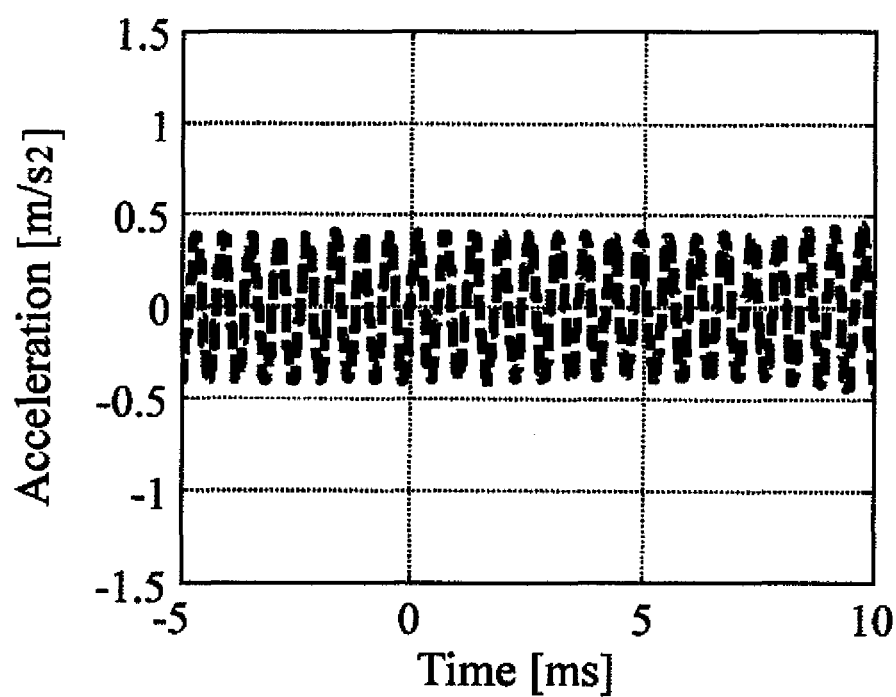
FIG. 25B is a graph showing a result of an output from a variable gain device B when the gain of the variable gain device B is fixed at 1 without using the third embodiment of the invention.
Figure 26A:
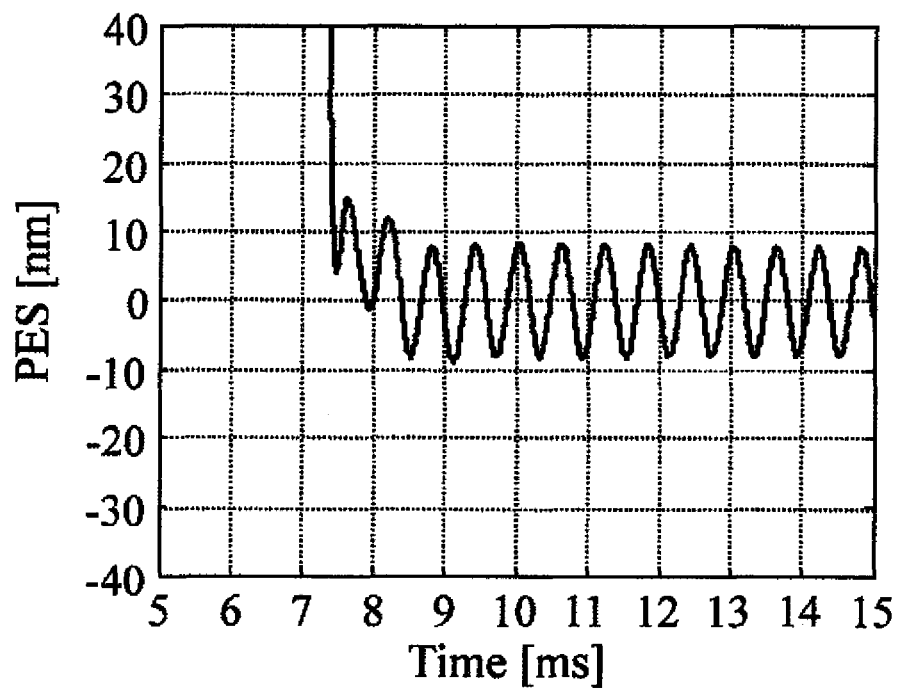
FIG. 26A is a graph showing a result of an error signal in the proximity of a target track in the third embodiment of the invention.
Figure 26B:
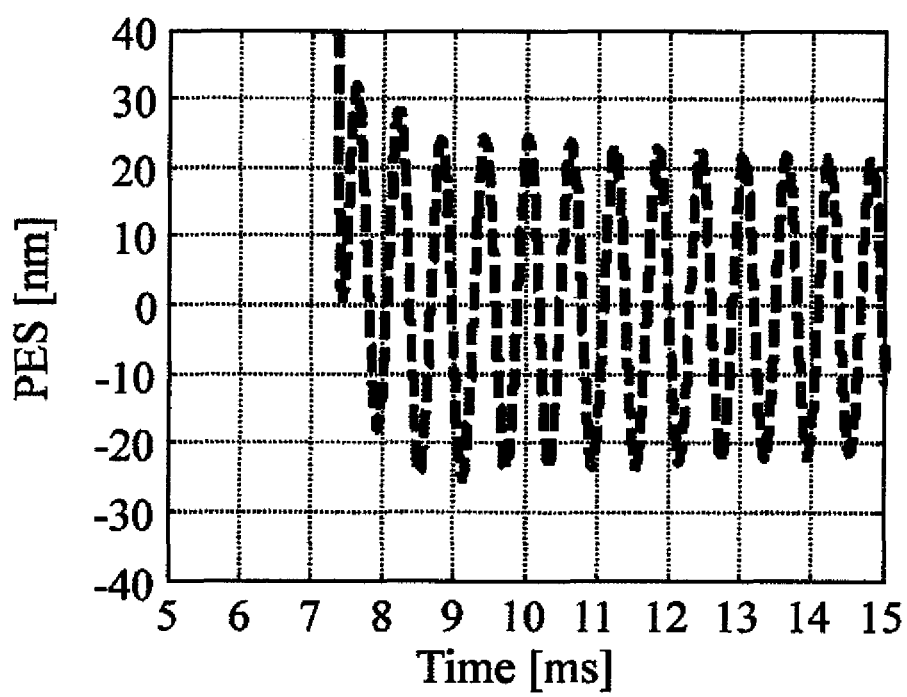
FIG. 26B is a graph showing a result of the error signal PES when the gain of the variable gain device B is fixed at 1 without using the third embodiment of the invention.
Figure 27A:
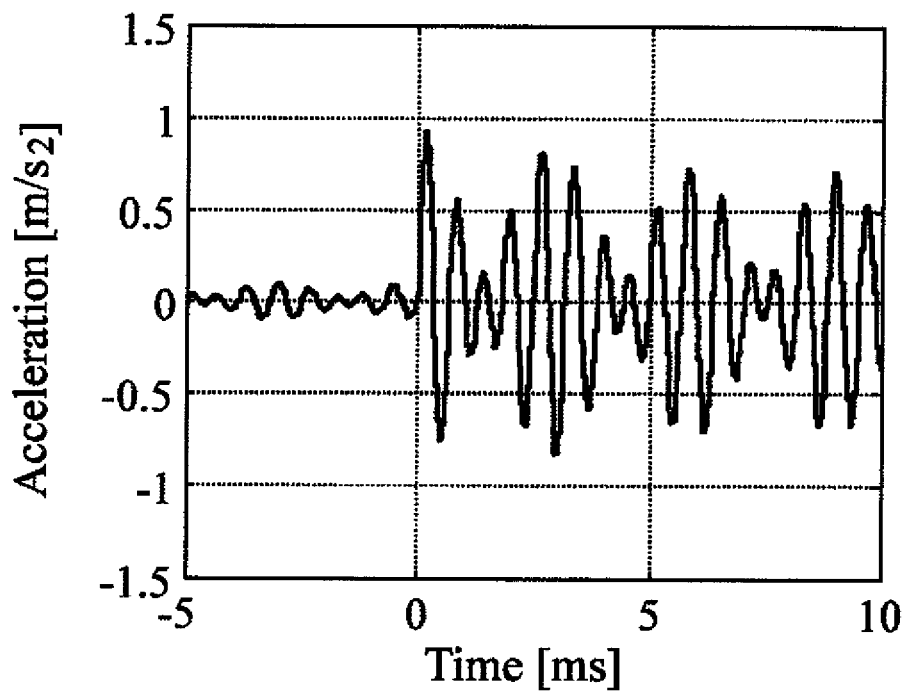
FIG. 27A is a graph showing a simulation result of an output from a variable gain device B in the fourth embodiment of the invention.
Figure 27B:
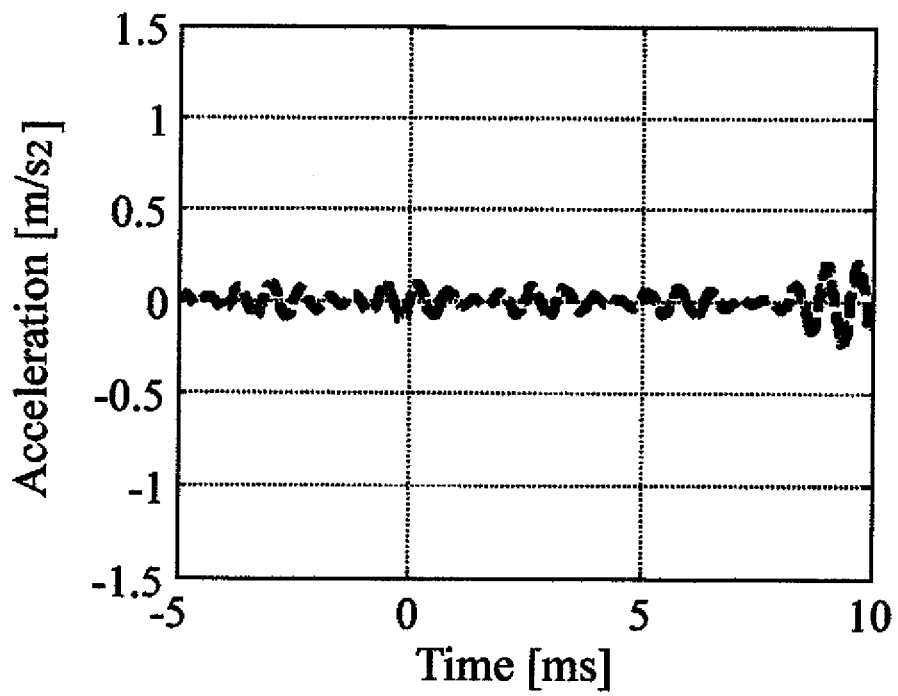
FIG. 27B is a graph showing a result of the output from the variable gain device B when the gain of the variable gain device B is fixed at 1 without using the fourth embodiment of the invention.
Figure 28:
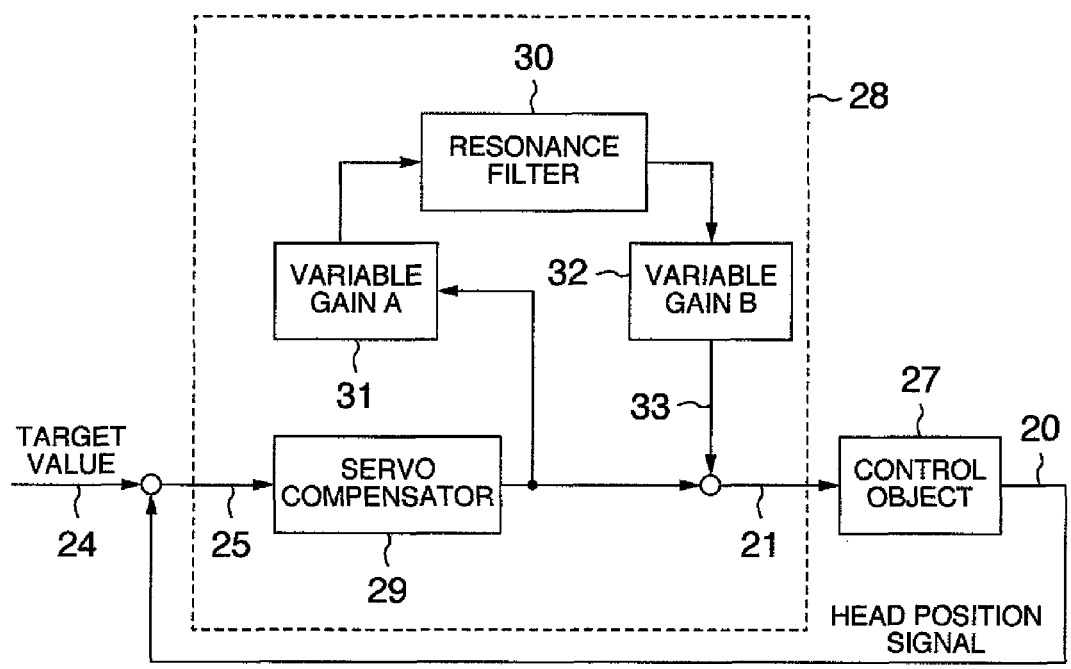
FIG. 28 is a block diagram showing another structural example of the following control system realized by MPU.

The invention claimed is:

1. A disk device including a control object constituted by an actuator, a head for executing a seek operation while driven by said actuator and a circuit for taking out a head position signal from information read out by said head from an information recording medium, and a control unit for generating an operation signal for said actuator so that an error signal as a difference between a target position of said head and a head position represented by said head position signal from said circuit becomes 0, wherein:

said control unit has a servo compensator for stabilizing transfer characteristics of said control object by using said error signal as an input, a variable gain device A the gain of which varies with the head position, a resonance filter using an output of said variable gain device A as its input and a variable gain device B using an output of said resonance filter as its input;

the gain of said variable gain device A is an inverse number of the gain of said variable gain device B;

an input signal to said variable gain device A is made 0 during the seek operation of said head and is said error signal near the end of the seek operation; and a signal as the sum of the output signal of said variable gain device B using the output signal of said resonance filter as its input signal and the output signal of said servo compensator is used as the input signal given to said actuator.

2. A disk device according to claim 1, wherein disturbance oscillation existing at the resonance frequency of said resonance filter has a characteristic such that amplitude thereof varies in accordance with a head position on said disk, and a characteristic of said variable gain device B is the same as the characteristic that the amplitude of the disturbance oscillation varies with the head position.

3. A disk device according to claim 1, wherein the input signal applied to said actuator is controlled by an output signal amplitude from said variable gain device B at the resonance frequency of said resonance filter being increased or decreased during the seek operation.

4. A disk device including a control object constituted by an actuator, a head for executing a seek operation while driven by said actuator and a circuit for taking out a head position signal from information read out by said head from an information recording medium, and a control unit for generating an operation signal for said actuator so that an error signal as a difference between a target position of said head and a head position represented by said head position signal from said circuit becomes 0, wherein:

said control unit has a servo compensator for stabilizing transfer characteristics of said control object by using said error signal as an input, a variable gain device A the gain of which varies in accordance with the target head position at the time of the seek operation, a resonance filter using an output of said variable gain device A as its input and a variable gain device B using an output of said resonance filter as its input;

the gain of said variable gain device A is an inverse number of the gain of said variable gain device B;

an input signal to said variable gain device A is made 0 during the seek operation of said head and is said error signal near the end of the seek operation; and a signal as the sum of the output signal of said variable gain device B using the output signal of said resonance filter as its input signal and the output signal of said servo compensator is used as the input signal given to said actuator.

5. A disk device according to claim 4, wherein disturbance oscillation existing at the resonance frequency of said resonance filter has a characteristic such that amplitude thereof varies in accordance with a head position on said disk, and a characteristic of said variable gain device B is the same as the characteristic that the amplitude of the disturbance oscillation varies with the head position.

6. A disk device according to claim 4, wherein the input signal applied to said actuator is controlled by an output signal amplitude from said variable gain device B at the resonance frequency of said resonance filter being increased or decreased during the seek operation.

7. A disk device including a control object constituted by an actuator, a head for executing a seek operation while driven by said actuator and a circuit for taking out a head position signal from information read out by said head from an information recording medium, and a control unit for generating an operation signal for said actuator so that an error signal as a difference between a target position of said head and a head position represented by said head position signal from said circuit becomes 0, wherein:

said control unit has a servo compensator for stabilizing transfer characteristics of said control object by using said error signal as an input, a variable gain device A the gain of which varies with the head position, a resonance filter using an output of said variable gain device A as its input and a variable gain device B using an output of said resonance filter as its input;

the gain of said variable gain device A is an inverse number of the gain of said variable gain device B;

an input signal to said variable gain device A is made 0 during the seek operation of said head and is an output signal of the servo compensator near the end of the seek operation; and a signal as the sum of the output signal of said variable gain device B using the output signal of said resonance filter as its input signal and the output signal of said servo compensator is used as the input signal given to said actuator.

8. A disk device according to claim 7, wherein disturbance oscillation existing at the resonance frequency of said resonance filter has a characteristic such that amplitude thereof varies in accordance with a head position on said disk, and a characteristic of said variable gain device B is the same as the characteristic that the amplitude of the disturbance oscillation varies with the head position.

9. A disk device according to claim 7, wherein the input signal applied to said actuator is controlled by an output signal amplitude from said variable gain device B at the resonance frequency of said resonance filter being increased or decreased during the seek operation.

10. A disk device including a control object constituted by an actuator, a head for executing a seek operation while driven by said actuator and a circuit for taking out a head position signal from information read out by said head from an information recording medium and a control unit for generating an operation signal for said actuator so that an error signal as a difference between a target position of said head and a head position represented by said head position signal from said circuit becomes 0, wherein:

said control unit has a servo compensator for stabilizing transfer characteristics of said control object by using said error signal as an input, a variable gain device A the gain of which varies in accordance with the target head position at the time of the seek operation, a resonance filter using an output of said variable gain device A as its input and a variable gain device B using an output of said resonance filter as its input;

the gain of said variable gain device A is an inverse number of the gain of said variable gain device B an input signal to said variable gain device A is made 0 during the seek operation of said head and is an output signal of said servo compensator near the end of the seek operation; and a signal as the sum of the output signal of said variable gain device B using the output signal of said resonance filter as its input signal and the output signal of said servo compensator is used as the input signal given to said actuator.

11. A disk device according to claim 10, wherein disturbance oscillation existing at the resonance frequency of said resonance filter has a characteristic such that amplitude thereof varies in accordance with a head position on said disk, and a characteristic of said variable gain device B is the same as the characteristic that the amplitude of the disturbance oscillation varies with the head position.

12. A disk device according to claim 10, wherein the input signal applied to said actuator is controlled by an output signal amplitude from said variable gain device B at the resonance frequency of said resonance filter being increased or decreased during the seek operation.

* * * * *